(12) United States Patent
Kobayashi et al.

(10) Patent No.: US 12,172,593 B2
(45) Date of Patent: Dec. 24, 2024

(54) OCCUPANT PROTECTION DEVICE

(71) Applicant: TOYOTA JIDOSHA KABUSHIKI KAISHA, Toyota (JP)

(72) Inventors: Isao Kobayashi, Okazaki (JP); Masato Kunisada, Nagoya (JP); Kazushi Furumaya, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/384,100

(22) Filed: Oct. 26, 2023

(65) Prior Publication Data
US 2024/0140343 A1 May 2, 2024

(30) Foreign Application Priority Data

Oct. 31, 2022 (JP) .................................. 2022-174864

(51) Int. Cl.
*B60R 21/0136* (2006.01)
*B60R 21/231* (2011.01)

(52) U.S. Cl.
CPC .... *B60R 21/0136* (2013.01); *B60R 21/23138* (2013.01); *B60R 2021/23146* (2013.01)

(58) Field of Classification Search
CPC .......... B60R 21/0136; B60R 21/23138; B60R 2021/23146; B60R 2021/23161;
(Continued)

(56) References Cited

U.S. PATENT DOCUMENTS 5,499,840 A * 3/1996 Nakano ................ B60N 2/0705
280/730.2
2010/0314859 A1* 12/2010 Tomitaka .............. B60R 21/207
280/730.2
(Continued)

FOREIGN PATENT DOCUMENTS

DE     102015207882 A1 * 11/2016 ............. B60N 2/143
DE     202020100026 U1 *  3/2020 ........... B60R 21/213
(Continued)

OTHER PUBLICATIONS

DE-102015207882-A1, Pascheka, Machine Translation of Specification (Year: 2016).*
(Continued)

*Primary Examiner* — Paul N Dickson
*Assistant Examiner* — Matthew Joseph Ganci
(74) *Attorney, Agent, or Firm* — Dinsmore & Shohl LLP (57) ABSTRACT

An occupant protection device includes a first side airbag disposed at an outer side in a width direction of a first seat, a second side airbag disposed at an outer side in the width direction of a second seat, and a far-side airbag disposed at an inner side in the width direction of the first seat and near the first seat, wherein when a side collision toward the first seat is detected, deployment of the far-side airbag is started after a first delay time has elapsed after deployment of the first side airbag is started, when a side collision toward the second seat is detected, deployment of the far-side airbag is started after a second delay time has elapsed after deployment of the second side airbag is started, and the first delay time is greater than the second delay time.

2 Claims, 6 Drawing Sheets

(58) Field of Classification Search
CPC ..... B60R 21/015; B60R 21/00; B60R 21/213; B60R 21/207; B60R 2021/23107
See application file for complete search history.

(56) References Cited

U.S. PATENT DOCUMENTS

2014/0042733 A1* 2/2014 Fukawatase ........ B60R 21/0136
280/730.2
2019/0337479 A1* 11/2019 Hill ....................... B60R 21/231

FOREIGN PATENT DOCUMENTS

| | | |
|---|---|---|
| JP | 2021-054243 A | 4/2021 |
| JP | 2021-191650 A | 12/2021 |
| WO | WO-2022075216 A1 * | 4/2022 |

OTHER PUBLICATIONS

DE-202020100026-U1, Min, Machine Translation of Specification (Year: 2020).*
WO-2022075216-A1, Atsushi, Machine Translation of Specification (Year: 2022).*

* cited by examiner

OCCUPANT PROTECTION DEVICE

CROSS REFERENCE TO RELATED APPLICATION

This application claims priority to Japanese Patent Application No. 2022-174864 filed on Oct. 31, 2022, which is incorporated herein by reference in its entirety including the specification, claims, drawings, and abstract.

TECHNICAL FIELD

The present specification discloses an occupant protection device that protects an occupant when an obstacle collides with a vehicle.

BACKGROUND

Conventionally, a side airbag is provided in a vehicle in order to appropriately protect an occupant of the vehicle when an obstacle collides with a side of the vehicle. The side airbag is disposed at an outer side in the vehicle width direction of the seat. When a side collision is detected, the occupant protection device deploys and inflates the side airbag. The inflated side airbag supports a body of the occupant falling down by the inertial force.

In recent years, it has been proposed to arrange a far-side airbag on the inner side in the vehicle width direction of the seat in order to more appropriately support an occupant. By providing such the far-side airbag, the occupant can be appropriately protected even when the occupant falls inward in the vehicle width direction.

CITATION LIST

Patent Literature

[Patent Document 1] JP 2021-191650 A

However, conventionally, deployment of the far-side airbag is often started immediately after deployment of the side airbag is started. In this case, the passenger may be pushed toward the door by the far-side airbag.

For example, consider a case where an obstacle collides with a side door on a driver seat side. In this case, the occupant seated on the driver seat falls toward the side door on the driver seat side by the inertial force. The body of the occupant is supported by the side airbag on the driver seat side. Here, when the deployment of the far-side airbag is started immediately after the deployment of the side airbag is started, the occupant is pushed toward the side airbag by the inflated far-side airbag. As a result, the force of the occupant toward the side airbag increases. In this case, the support performance of the side airbag must be increased, but this causes a problem such as an increase in cost.

Patent Document 1 discloses a technology in which a side airbag is disposed at an outer side in a vehicle width direction of a seat and a far-side airbag is disposed at an inner end portion in the vehicle width direction of a seat frame. However, in the technology described in Patent Document 1, the relationship between the inflation start timing of the side airbag and the inflation start timing of the far-side airbag is not examined. Therefore, the technology described in Patent Document 1 cannot prevent the occupant from being pressed toward the door side by the far-side airbag.

Accordingly, the present specification discloses an occupant protection device capable of suppressing an occupant from being pressed toward a door side by a far-side airbag.

SUMMARY

An occupant protection device disclosed herein includes a first side airbag disposed at an outer side in a vehicle width direction of a first seat, a second side airbag disposed at an outer side in the vehicle width direction of a second seat, the second side airbag being adjacent to the first seat in the vehicle width direction and a far-side airbag disposed at an inner side in the vehicle width direction of the first seat and closer to the first seat than the second seat, wherein when a side collision toward the first seat side is detected, deployment of the far-side airbag is started after a first delay time has elapsed after deployment of the first side airbag is started, when a side collision toward the second seat side is detected, deployment of the far-side airbag is started after a second delay time has elapsed after deployment of the second side airbag is started, and the first delay time is greater than the second delay time.

According to the configuration disclosed in this specification, the deployment of the far-side airbag is prevented from being started more early than necessary. As a result, the occupant is prevented from being pushed toward the door side by the far-side airbag.

BRIEF DESCRIPTION OF DRAWINGS

Embodiment(s) of the present disclosure will be described based on the following figures, wherein.

EMBODIMENTS

Figure 1:
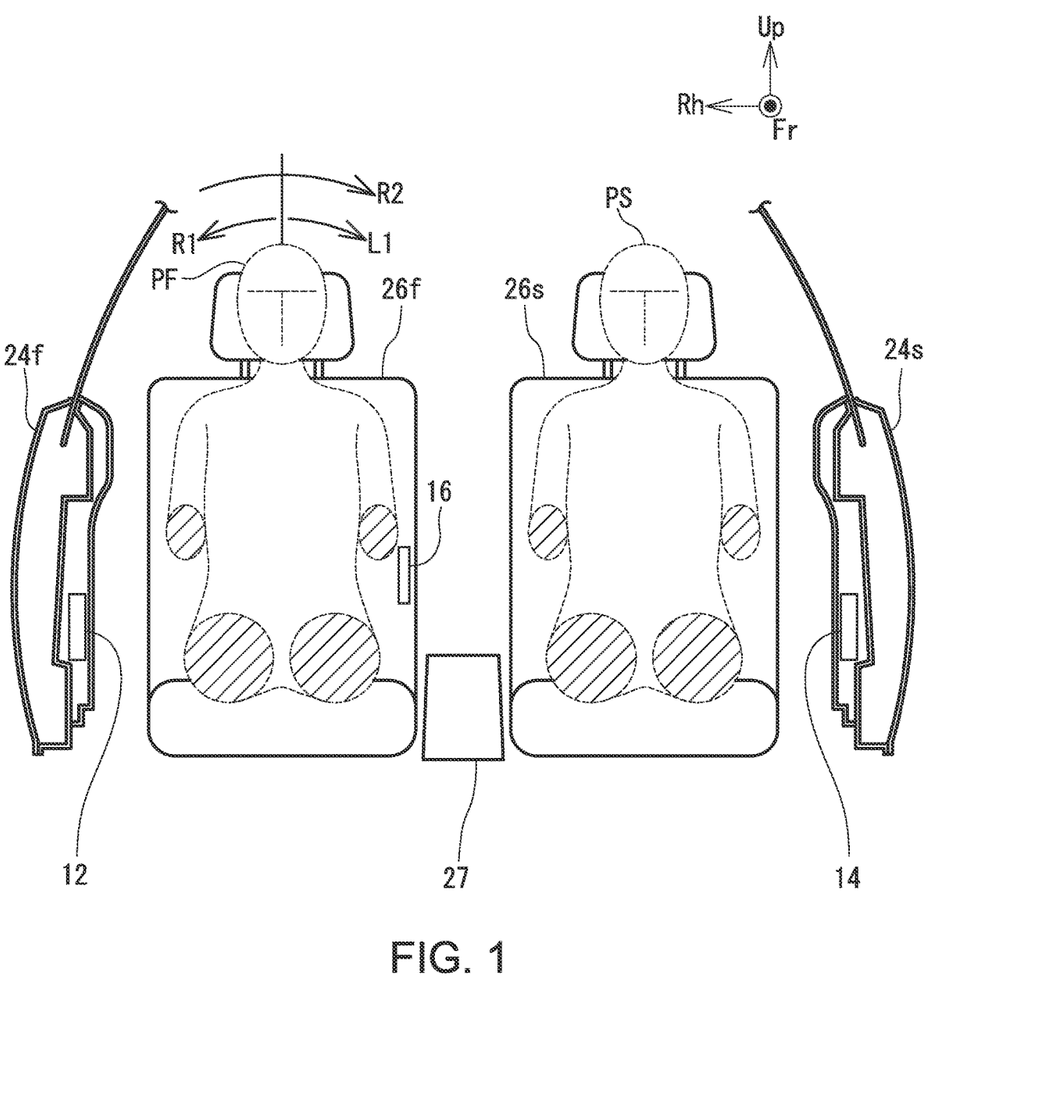
FIG. 1 is a schematic view of a front seat of a vehicle as viewed from the front of the vehicle.
Figure 2:
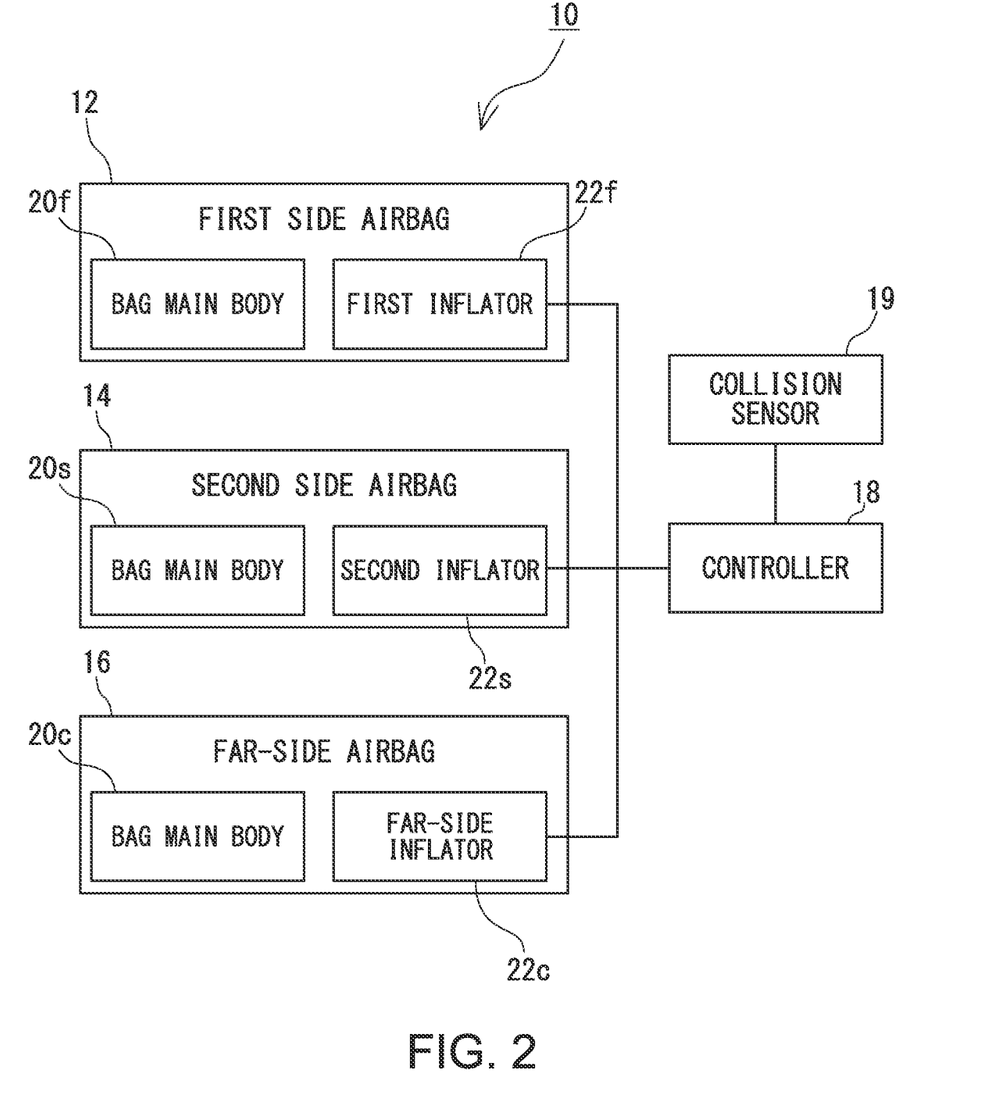
FIG. 2 is a block diagram showing a configuration of an occupant protection device.

Hereinafter, a configuration of the occupant protection device 10 will be described with reference to the drawings. FIG. 1 is a schematic view of a front seat of a vehicle as viewed from the front of the vehicle. FIG. 2 is a block diagram showing a configuration of the occupant protection device 10. In the following drawings, "Up", "Fr", and "Rh" indicate the upper side, the front side, and the right side of the vehicle, respectively.

The vehicle includes a first seat 26f and a second seat 26s. The first seat 26f and the second seat 26s are arranged in the front portion of the vehicle and are arranged side by side in the vehicle width direction. In this example, the first seat 26f is a driver seat and is positioned on the right side of the vehicle. The second seat 26s is a passenger seat and is positioned on the left side of the vehicle. In the following description, the occupant seated on the first seat 26f is referred to as a "first occupant PF", and the occupant seated on the second seat 26s is referred to as a "second occupant PS".

A center console box 27 is disposed between the first seat 26f and the second seat 26s. A first side door 24f is disposed on the right side of the first seat 26f, and a second side door 24s is disposed on the left side of the second seat 26s.

The occupant protection device 10 protects the first occupant PF and the second occupant PS when an obstacle collides with the vehicle. As shown in FIG. 2, the occupant protection device 10 includes a first side airbag 12, a second side airbag 14, a far-side airbag 16, a controller 18, and a collision sensor 19. As shown in FIG. 1, the first side airbag 12 is disposed inside the first side door 24f. The first side airbag 12 may be disposed at the seat frame. The first side airbag 12 operates when a right-side collision occurs in which an obstacle collides with the first side door 24f to protect the first occupant PF. The first side airbag 12 includes a bag main body 20f and an inflator 22f. The bag main body 20f is housed inside the first side door 24f in a folded state before the occurrence of the side collision. When a right collision occurs, the bag main body 20f expands and supports the body of the first occupant PF. In the course of this deployment, the bag main body 20f jumps out from the first side door 24f to the vehicle compartment. When ignited, the first inflator 22f ejects a gas for deploying and inflating the bag main body 20f. Accordingly, the ignition timing of the first inflator 22f can be regarded as the deployment start timing of the first side airbag 12. Ignition of the first inflator 22f is controlled by a controller 18 described later.

The second side airbag 14 is disposed inside the second side door 24s. The second side airbag 14 may be disposed at the seat frame. The second side airbag 14 operates when a left-side collision occurs in which an obstacle collides with the second side door 24s to protect the second occupant PS. The second side airbag 14 has a configuration similar to that of the first side airbag 12. That is, the second side airbag 14 includes an inflatable bag main body 20s and a second inflator 22s that supplies gas to the bag main body 20s.

The far-side airbag 16 is disposed at an inner side in the vehicle width direction of the first seat 26f and closer to the first seat 26f than the second seat 26s. For example, the far-side airbag 16 is disposed at an inner end portion (i.e., a left end portion) in the vehicle width direction of the frame of the first seat 26f. The far-side airbag 16 operates when a side collision occurs, and prevents the first occupant PF from falling deeply toward the second seat 26s side. The far-side airbag 16 also includes an inflatable bag main body 20c and a far-side inflator 22c that supplies gas to the bag main body 20c.

The collision sensor 19 detects the presence or absence of a collision and a collision direction. The collision sensor 19 is, for example, an acceleration sensor. Further, the number of collision sensors 19 is not limited to one, and a plurality of collision sensors 19 may be provided. In any case, the collision sensor 19 can distinguish and detect the right-side collision and the left-side collision.

The controller 18 controls ignition of the inflators 22f, 22s, and 22c. Specifically, when the right-side collision is detected, the controller 18 immediately ignites the first inflator 22f. After that, the controller 18 ignites the far-side inflator 22c at the timing when the prescribed first delay time tf has elapsed. When the left-side collision is detected, the controller 18 immediately ignites the second inflator 22s. After that, the controller 18 ignites the far-side inflator 22c at the timing when the prescribed second delay time ts has elapsed. The first delay time tf and the second delay time ts are values stored in advance in a memory. The first delay time tf is larger than the second delay time ts. In other words, the occupant protection device 10 changes the delay time from the detection of the side collision until the ignition of the far-side inflator 22c according to the direction of the side collision. The reason for this configuration will be described later. Such a controller 18 is physically a computer having a processor and a memory.

Figure 3:
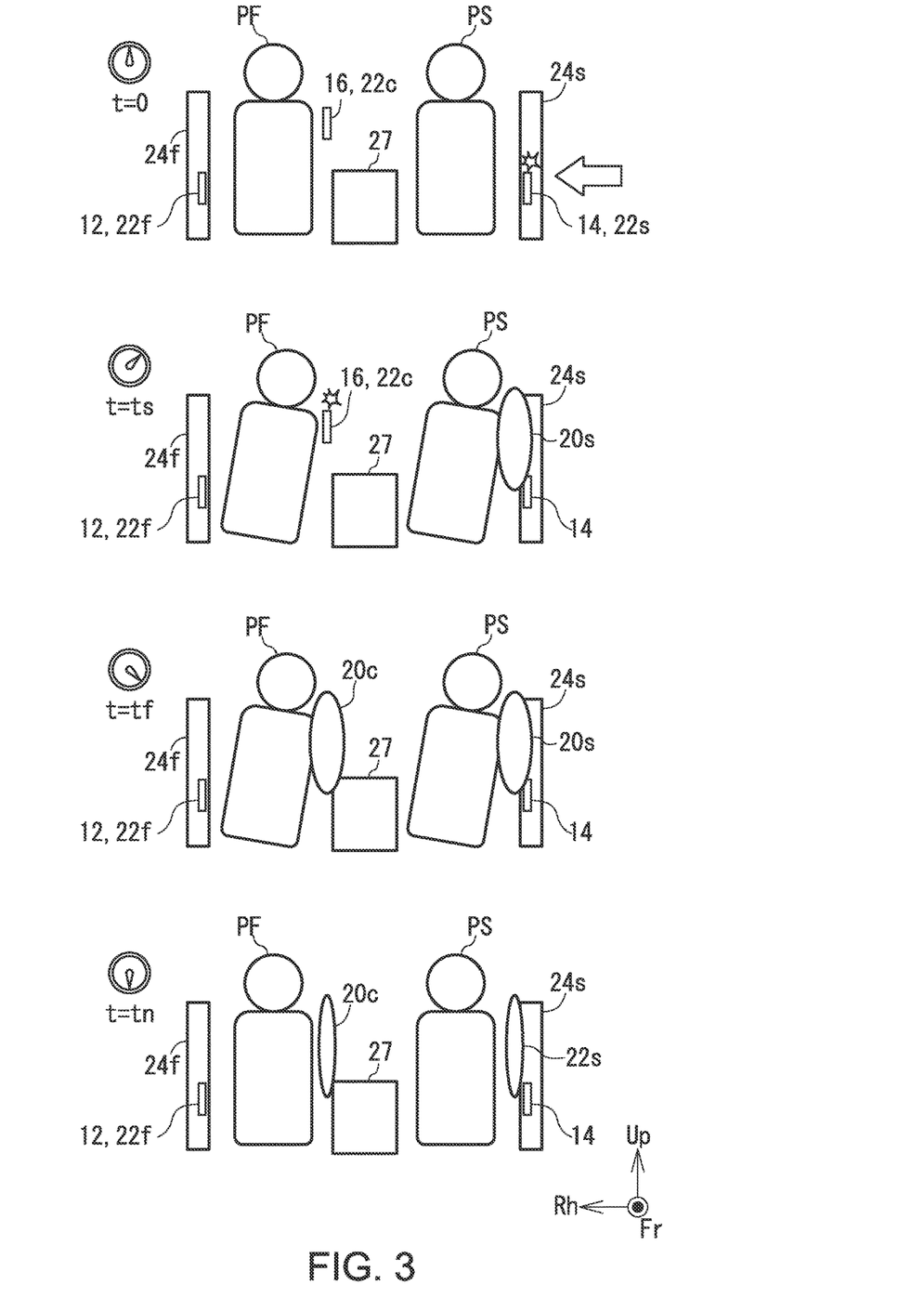
FIG. 3 is a schematic view showing an operation of the occupant protection device when a left collision occurs.

Next, the operation of the occupant protection device 10 will be described. FIG. 3 is a schematic view showing an operation of the occupant protection device 10 when a left-side collision occurs. In FIG. 3, a left-side collision is detected at the timing of time t=0. When a left-side collision occurs, the first occupant PF and the second occupant PS fall deeply to the left side of the vehicle by the inertial force. The controller 18 ignites the second inflator 22s immediately upon detection of the left-side collision. By the ignition, the bag main body 20s of the second side airbag 14 deploys and inflates. As a result, the bag main body 20s having impact absorption properties is interposed between the second occupant PS and the second side door 24s. Thereby, collision of the second occupant PS with the second side door 24s is prevented.

Figure 4:
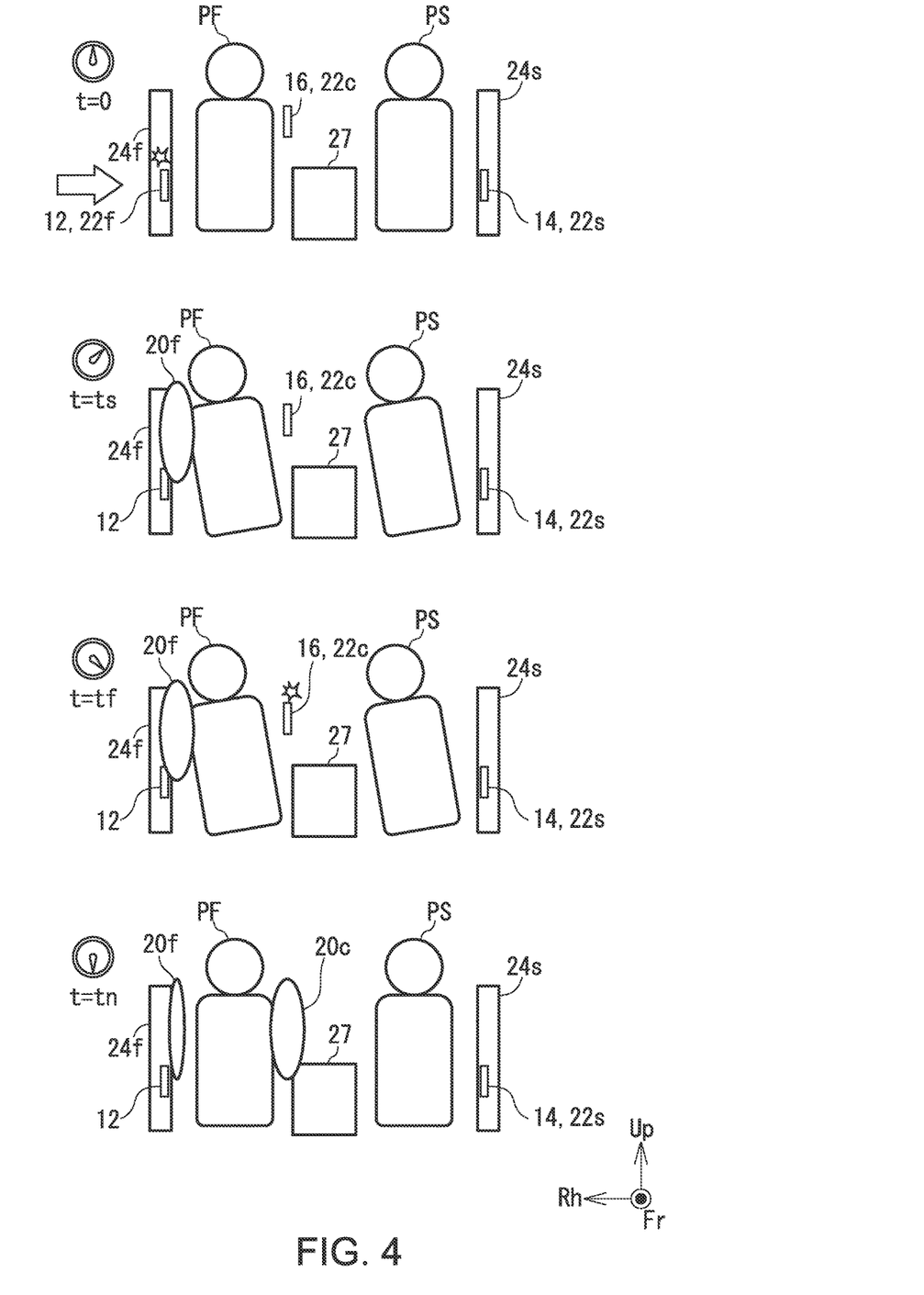
FIG. 4 is a schematic view showing an operation of the occupant protection device when a right collision occurs.

Assume that a prescribed second delay time ts has elapsed after ignition of the second inflator 22s. At time t=ts, the controller 18 ignites the far-side inflator 22c. The ignition of the far-side inflator 22c causes, the bag main body 20c of the far-side airbag 16 deploys and inflates. This prevents the first occupant PF from falling to the left deeply. Here, the second delay time ts is a time from the occurrence of the left-side collision until the upper body of the first occupant PF is largely inclined, and is, for example, 3 msec or more and 10 msec or less. At time t=tn at which a sufficient time has elapsed, the volume of the two bag main bodies 20c and 20s decreases as a result of absorbing the impact. Next, an operation when a right-side collision occurs will be described. FIG. 4 is a schematic diagram showing the operation of the occupant protection device 10 when a right-side collision occurs. In FIG. 4, a right-side collision is detected at the timing of time t=0. When a right-side collision occurs, the first occupant PF and the second occupant PS fall deeply to the right side of the vehicle by the inertial force. The controller 18 ignites the first inflator 22f immediately upon detection of a right-side collision. By the ignition, the bag main body 20f of the first side airbag 12 deploys and inflates. This prevents the collision of the first occupant PF with the first side door 24f.

After ignition of the first inflator 22f, the controller 18 ignites the far-side inflator 22c when a predetermined delay time has elapsed. However, unlike the case of FIG. 3, the controller 18 does not ignite the far-side inflator 22c at the timing when the second delay time ts has elapsed. The controller 18 ignites the far-side inflator 22c at a timing when a first delay time tf larger than the second delay time ts has elapsed. With this ignition, the bag main body 20c of the far-side airbag 16 deploys and inflates. This prevents the first occupant PF pushed back from the bag main body 20f from falling to the left. At time t=tn when a sufficient time has elapsed, the volume of the bag main body 20f of the first side airbag 12 decreases as a result of absorbing the impact.

Here, as is apparent from the above description, in this example, the delay times tf and ts until the deployment of the far-side airbag 16 is started are changed according to the direction of the side collision. The reason for this configuration will be described. When the left collision occurs, the first occupant PF falls to the left at an early timing. When a left collision occurs in order to support the first occupant PF, the controller 18 ignites the far-side inflator 22c after waiting for the second delay time ts.

On the other hand, when the right-side collision occurs, the first occupant PF falls in the right direction immediately after the side collision, i.e., in the opposite direction to the far-side airbag 16. In this case, if the deployment of the bag main body 20c of the far-side airbag 16 is started early, the first occupant PF is pushed by the first side door 24f by the bag main body 20c. As a result, a momentum of the movement of the first occupant PF toward the first side door 24f may increase. If the momentum of the movement of the first occupant PF increases, it is necessary to increase the impact absorbing capability of the first side airbag 12. However, when the impact absorbing capability of the first side airbag 12 is increased, another problem such as an increase in cost and an increase in size is caused.

Therefore, when the right-side collision occurs, the controller 18 ignites the far-side inflator 22c after the first delay time tf larger than the second delay time ts has elapsed. This prevents the first occupant PF from being pressed by the first side door 24f by the bag main body 20c immediately after the side collision.

On the other hand, when the first occupant PF collides with the bag main body 20f of the first side airbag 12, the first occupant PF is pushed back to the left side by a reaction force received from the bag main body 20f. At time t=tf, the far-side inflator 22 is ignited and deployment of the bag main body 20c is started, whereby the first occupant PF pushed back to the left side is supported by the bag main body 20c.

The first delay time tf is not particularly limited as long as it is larger than the second delay time ts. However, if the first delay time tf is excessively short, the far-side airbag 16 may accelerate the movement of the first occupant PF to the right side. If the first delay time tf is excessively large, the first occupant PF cannot be prevented from falling to the left side. Therefore, the first delay time tf may be twice or more and four times or less the second delay time ts. This will be described with reference to FIG. 1.

When the left collision occurs, the upper body of the first occupant PF moves to the left side of the vehicle, i.e., along the path L1 in FIG. 1. Therefore, normally, the second delay time ts is set based on the time required for the movement along the path L1.

On the other hand, when a right-side collision occurs, the upper body of the first occupant PF moves to the right side of the vehicle, and then is pushed back by the bag main body 20f of the first side airbag 12 to move to the left side of the vehicle. That is, when a right collision occurs, the upper body of the first occupant PF moves along the path R1 in FIG. 1, and then moves along the path R2 in FIG. 1. Therefore, normally, the first delay time tf is set based on the time required for the movement along the path R1 and the path R2.

Here, as is apparent from FIG. 1, the total distance between the path R1 and the path R2 is about three times the distance of the path L1. Therefore, the first delay time tf may be about three times the second delay time ts. However, the time required for the movement along the path R1 and the path R2 varies depending on the position, configuration, and the like of the seat 26. Therefore, the first delay time tf may be appropriately changed within a range from twice to four times the second delay time ts.

Figure 5:
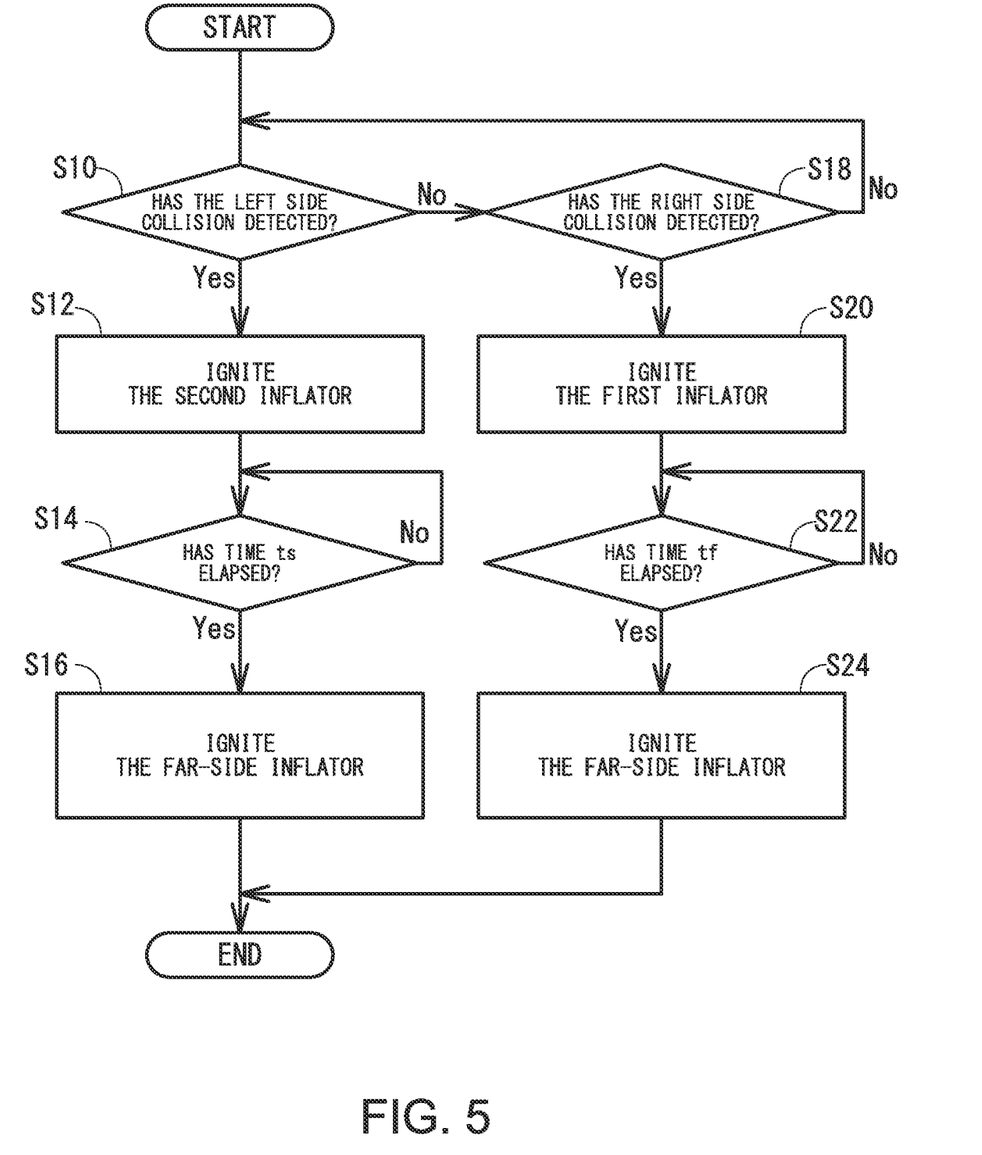
FIG. 5 is a flowchart showing a flow of processing by the controller.

Next, the processing of the controller 18 will be described with reference to FIG. 5. As shown in FIG. 5, the controller 18 monitors the presence or absence of a side collision based on the output value of the collision sensor 19 (S10, S18). When the left collision is detected (Yes in S10), the controller 18 ignites the second inflator 22s (S12). Thereafter, the controller 18 waits for the second delay time ts (S14). When the second delay time ts has elapsed, the controller 18 ignites the far-side inflator 22c (S16). Thus, the processing ends.

When the right collision is detected (Yes in S18), the controller 18 ignites the first inflator 22f (S20). Thereafter, the controller 18 waits for the first delay time tf (S22). When the first delay time tf has elapsed, the controller 18 ignites the far-side inflator 22c (S24). Thus, the processing ends.

Figure 6:
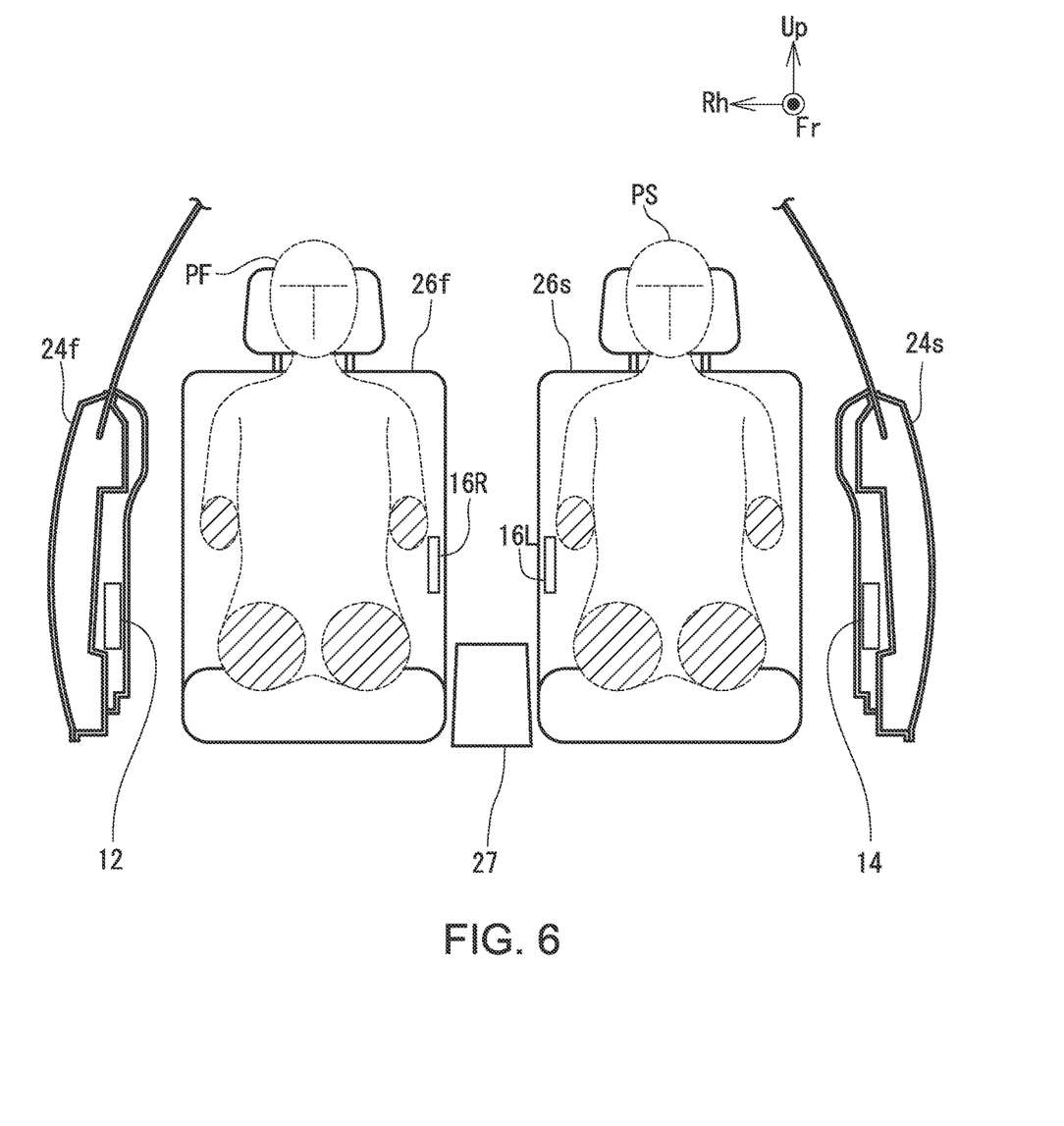
FIG. 6 is a diagram showing another configuration of the occupant protection device.

As apparent from the above description, in the occupant protection device 10 disclosed in the present specification, the timing of the inflation start of the far-side airbag 16 disposed near the first seat 26f is changed according to the direction of the side collision. Specifically, the inflation start timing when the collision toward the first seat 26f side is detected is delayed from the inflation start timing when the collision toward the second seat 26s side is detected. This configuration prevents the first occupant PF from being pushed toward the side door 24 by the far-side airbag 16. The configuration described above is an example, and the configuration may be changed to another configuration as long as the first delay time tf is larger than the second delay time ts. For example, in the above description, the far-side airbag 16 is disposed in the first seat 26f. However, the far-side airbag 16 may be disposed at other portions, such as the center console box 27. Further, the number of far-side airbags 16 is not limited to one, but may be two. For example, as shown in FIG. 6, the right far-side airbag 16R may be disposed at the left end of the first seat 26f (i.e., the right seat), and the left far-side airbag 16L may be disposed at the right end of the second seat 26s (i.e., the left seat). In this case, when the left-side collision is detected, deployment of the right far-side airbag 16R is started after the second delay time ts has elapsed, and deployment of the left far-side airbag 16L is started after the first delay time tf has elapsed. When the right-side collision is detected, deployment of the left far-side airbag 16L is started after the second delay time ts has elapsed, and deployment of the right far-side airbag 16R is started after the first delay time tf has elapsed.

REFERENCE SIGNS LIST occupant protection device, 12 first side airbag, 14 second side airbag, 16 far-side airbag, 18 controller, 19 collision sensor, 20c bag main body, 20f bag main body, 20s bag main body, 22c far-side inflator, 22f first inflator, 22s second inflator, 24f first side door, 24s second side door, 26f first seat, 26s second seat, 27 center console box, PF first occupant, PS second occupant.

The invention claimed is:

1. An occupant protection device comprising:
a first side airbag disposed in a first door at an outer side in a vehicle width direction of a first seat;
a second side airbag disposed in a second door at an outer side in the vehicle width direction of a second seat, the second seat being adjacent to the first seat in the vehicle width direction; and
a far-side airbag disposed at an inner side in the vehicle width direction of the first seat and closer to the first seat than the second seat; wherein:
when a side collision toward the first seat side is detected, deployment of the far-side airbag is started after a first delay time has elapsed after deployment of the first side airbag is started,
when a side collision toward the second seat side is detected, deployment of the far-side airbag is started after a second delay time has elapsed after deployment of the second side airbag is started, and the first delay time is twice or more and four times or less the second delay time.

2. The occupant protection device according to claim 1, wherein:

the first seat is a driver seat, and the second seat is a passenger seat, and the far-side airbag is disposed in a frame of the driver seat.

* * * * *